United States Patent
Martens et al.

[11] Patent Number: 5,970,512
[45] Date of Patent: Oct. 19, 1999

[54] TRANSLATION SHADOW ARRAY ADDER-DECODER CIRCUIT FOR SELECTING CONSECUTIVE TLB ENTRIES

[75] Inventors: David James Martens, Austin; Michael Kevin Ciraula, Round Rock, both of Tex.

[73] Assignee: International Business Machines Corporation, Armonk, N.Y.

[21] Appl. No.: 08/826,174

[22] Filed: Mar. 27, 1997

[51] Int. Cl.[6] .................................................... G06F 12/10
[52] U.S. Cl. ........................................... 711/205; 711/207
[58] Field of Search .................................. 711/204, 205, 711/207, 213, 220

[56] References Cited

U.S. PATENT DOCUMENTS

| | | | |
|---|---|---|---|
| 4,695,950 | 9/1987 | Brandt et al. | 364/200 |
| 4,792,895 | 12/1988 | Tallman | 364/200 |
| 4,802,084 | 1/1989 | Ikegaya et al. | 364/200 |
| 5,321,836 | 6/1994 | Crawford et al. | 395/400 |
| 5,341,485 | 8/1994 | Hattersley et al. | 395/400 |
| 5,435,004 | 7/1995 | Cox et al. | 395/575 |
| 5,502,829 | 3/1996 | Sachs | 395/417 |
| 5,532,947 | 7/1996 | Potter et al. | 364/715.01 |

*Primary Examiner*—Eddie P. Chan
*Assistant Examiner*—Kevin Verbrugge
*Attorney, Agent, or Firm*—Anthony V. S. England; Daniel E. Venglarik; Andrew J. Dillon

[57] ABSTRACT

A combined adder/decoder calculates a field within an effective address necessary to access a translation array. Rather than adding the full lengths of the previous fetch address and offset, only the bits corresponding to the field are added. A carry-in value from less significant bits is concurrently generated. Based on the sum result, two wordlines are chosen: the wordline corresponding to the sum result calculated and the next higher wordline. The carry-in value is used to select the appropriate wordline from the chosen pair. Because fewer bits are added and the carry-in need not be accounted for in the adder, the generation and decoding processes are faster and allow address translation to be started earlier in the processor cycle.

18 Claims, 6 Drawing Sheets

TRANSLATION SHADOW ARRAY ADDER-DECODER CIRCUIT FOR SELECTING CONSECUTIVE TLB ENTRIES

BACKGROUND OF THE INVENTION

1. Technical Field

The present invention relates in general to address translation facilities in processors and in particular to logic circuits in processors for calculating effective addresses. Still more particularly, the present invention relates to effective address calculation in a processor which provides early determination of the next data fetch address.

2. Description of the Related Art

The address translation process is a necessary function in modern processors. Often the address translation circuits are directly in the critical path. For this reason, improvements in the delay or starting time of the translation circuits will usually be of substantial value. Address translation performance is also critical because load and store processor instructions, which require address translations, generally comprise a large percentage of the instructions encountered during execution of typical code by a processor.

The address translation process starts with an effective address (EA) to be translated, then uses that address to determine the physical address in memory corresponding to the effective address. During a fetch from memory, the first step in the process is to determine the specific effective address that must be fetched. This determination is usually calculated with some type of adder circuit. The address calculation is followed by a fetch from a local cache if possible, and is completed with the actual delivery of results from the requested location in physical memory.

While the local cache fetch is being executed, a second circuit executes an address translation on the fetch address so that the correspondence between the effective address and the physical address is known. Absent some alternative, a full translation of the effective address to the physical address is required to retrieve the instruction or data from memory. However, the complete translation of an effective address to a physical address is lengthy process. Therefore, faster methods of determining the physical address to be accessed may be executed concurrently with the full address translation process.

A translation cache, also known as a translation array or translation lookaside buffer (TLB), containing known address translations may be employed to speed translation. The entries in the translation lookaside buffer contain translations of effective address to physical address for data in the local cache. When a translation array is employed, the cached addresses are indexed by a field from the effective address. To access the translation cache, an effective address must be generated, followed by a wordline decode to provide a signal indicating which entry in the translation cache should be employed.

The generation of an effective address is accomplished by adding two 32-bit numbers to form the next effective address to be translated and fetched. Conceptually, this effective address is generated by taking the previous fetch address and adding a 32 bit offset to form a 32 bit result address. Efficient implementations of the necessary 32 bit adder are known. However, a 32 bit sum result requires more time to generate that sum results of smaller sizes. It would be desirable therefore, to reduce the process of effective address generation to an addition of smaller numbers. It would also be advantageous to combine the addition process necessary to generate and effective address with the decode process utilized to determine which translation cache entry should be employed. Either improvement would speed performance of the processor's address translation mechanism, significantly improving the overall performance of the processor. It would be desirable for the improvement to comprise a simple, cost effective modification to existing processor designs.

SUMMARY OF THE INVENTION

It is therefore one object of the present invention to provide an improved address translation mechanism for processors.

It is another object of the present invention to provide improved logic circuits for calculating effective addresses in processors.

It is yet another object of the present invention to provide an improved method of effective address calculation in a processor providing early determination of the next data fetch address.

The foregoing objects are achieved as is now described. A combined adder/decoder calculates a field within an effective address necessary to access a translation array. Rather than adding the full lengths of the previous fetch address and offset, only the bits corresponding to the field are added. A carry-in value from less significant bits is concurrently generated. Based on the sum result, two wordlines are chosen: the wordline corresponding to the sum result calculated and the next higher wordline. The carry-in value is used to select the appropriate wordline from the chosen pair. Because fewer bits are added and the carry-in need not be accounted for in the adder, the generation and decoding processes are faster and allow address translation to be started earlier in the processor cycle.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
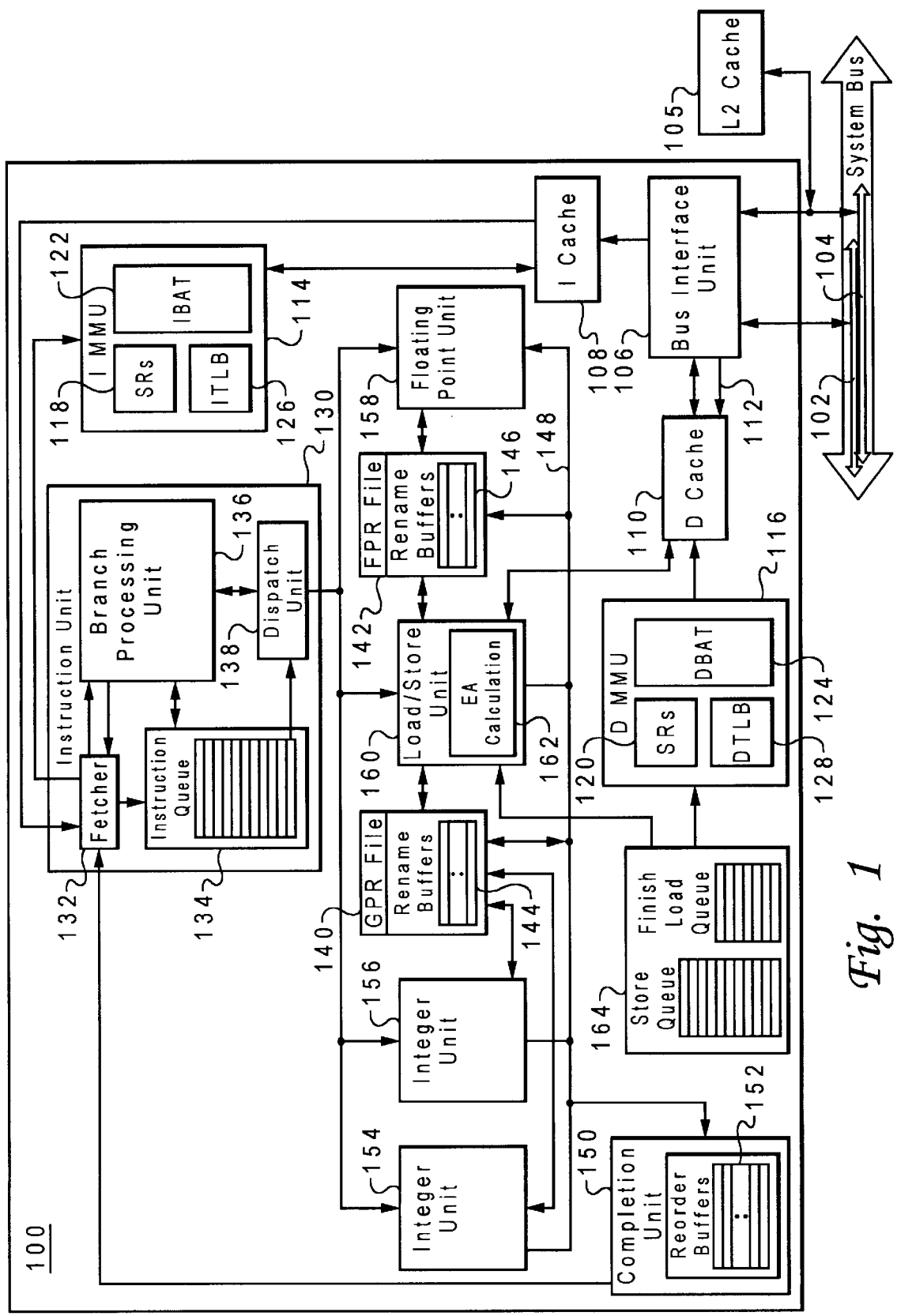
FIG. 1 depicts a processor within the data processing system in which a preferred embodiment of the present invention may be implemented.

With reference now to the figures, and in particular with reference to FIG. 1, a block diagram of a processor in which a preferred embodiment of the present invention may be implemented is depicted. In the example shown, processor 100 is a single integrated circuit superscalar microprocessor, such as the PowerPC™ processor available from IBM Corporation, Austin, Tex. Accordingly, processor 100 includes various execution units, registers, buffers, memories, and other sections, all of which are formed by integrated circuitry. Processor 100 also operates according to reduced instruction set computing ("RISC") techniques.

As shown in FIG. 1, processor 100 is connected to a system bus comprising address bus 102 and data bus 104. Processor 100 is also connected to L2 cache 105 and, through the system bus, to a main memory (not shown). Bus interface unit 106 within processor 100 controls the transfer of data and instructions between processor 100 and system bus. Bus interface unit 106 supports burst-read memory operations, burst-write memory operations, direct-store operations, and noncacheable or write-through memory read and write operations. Bus interface unit 106 implements critical data first access, in which requested data is fetched first and remaining data is fetched later. Address bus 102 and data bus 104 are independent for memory accesses, allowing bus pipelining and out-of-order split bus transactions. Through bus interface unit 106, processor 100 supports weakly ordered memory accesses. Sequences of operations, including load/store string/multiple instructions, do not necessarily complete in the same order in which they began, maximizing the bus efficiency without sacrificing data coherency.

Bus interface unit 106 is connected to instruction cache (I Cache) 108 and to data cache (D Cache) 110 in processor 100. Cache coherency is not maintained by hardware, although special instructions allow either instruction cache 108 or data cache 110 to be invalidated entirely or on a cache block basis. Cache coherency is further ensured through data cache 110 support of the four-state modified/exclusive/shared/invalid (MESI) protocol for cache blocks. The modified state indicates that the cache block is modified with respect to system memory, and data for the specified address is valid only in data cache 110 and not in system memory. The exclusive state indicates that the cache block holds valid data identical to the data in system memory, and that no other cache has that data. The shared state indicates that the cache block holds valid data identical to the data in system memory and at least one other caching device. The invalid state indicates that the cache block does not hold valid data.

Separate access 112 between bus interface unit 106 and data cache 110 is provided for snooping. A separate queue within bus interface unit 106 for snoop push operations allows these operations to access the bus before previously queued bus operations. A data bus write only signal for reordering write operations may be used to reorder snoop push operations. Bus interface unit 106 supports address retry activity for occasions when a snooped read access hits a modified line in data cache 110.

Instruction cache 108 and data cache 110 are respectively controlled by instruction memory management unit (I MMU) 114 and data memory management unit (D MMU) 116. The primary function of memory management units 114 and 116 is translation of logical (effective) addresses to physical (real) addresses for memory accesses, I/O accesses (most of which are assumed to be memory-mapped), and direct-store interface accesses. Memory management units 114 and 116 also provide access protection on a segment, block, or page basis.

Memory management units 114 and 116 enable processor 100 to support demand-paged virtual memory, allowing programs larger than the physical memory size to be executed with individual pages loaded into physical memory from system memory only as required by an executing program. With virtual memory, instruction and data accesses to memory generated by load and store instruction require address translations. Segment descriptors and page tables are employed in the address translation for effective-to-real address mapping. Segment information is utilized to translate the effective address to an interim virtual address, while page table information is utilized to translate the interim virtual address to a physical address.

Memory management units 114 and 116 each comprise segment registers (SRs) 118 and 120, block address translation facilities (IBAT) 122 and (DBAT) 124, and translation lookaside buffers (ITLB) 126 and (DTLB) 128. Segment descriptors, used to generate interim virtual addresses, are stored in segment registers 118 and 120. Block address translation facilities 122 and 124 store, in a software-controlled array, the available block address translations. Translation lookaside buffers 126 and 128 keep translations of virtual addresses (the effective address with any offset such as a segment offset) to real addresses on a page basis and may be accessed simultaneously.

Instruction cache 108 provides up to four instructions per cycle to instruction unit 130. Fetcher 132 within instruction unit 130 provides instructions obtained from instruction cache 108 to instruction queue 134, sequentially fetching as many as four instructions at a time using the next sequential address or the address supplied by branch processing unit 136 when a branch is predicted or resolved. Branch processing unit 136 provides fetcher 132 with predicted target instruction addresses when a branch is predicted and mispredict-recovery addresses if a branch was incorrectly predicted. Branch processing unit 136 also executes all condition register logical and flow control instructions.

Instructions within instruction queue 134 are decoded and issued to the appropriate execution unit by dispatch unit 138. Logic within dispatch unit 138 resolves unconditional branch instructions and predicts the result of conditional branch instructions indicating four-levels of dynamic prediction based on the history of a branch's direction: strongly not-taken, not-taken, taken, and strongly taken. Dispatch unit 138 also performs dependency checking between instructions obtained from instruction queue 134, allocating a reorder buffer entry for each instruction. Dispatch unit 138 allocates each instruction to the appropriate execution unit and notifies fetch unit 132 when the instruction queue may be updated with more instructions.

During dispatch, instruction operands are provided to the execution units from general purpose register (GPR) file 140, floating point register (FPR) file 142, rename buffers 144 and 146 within general purpose register file 140 and floating point register file 142, respectively, or result bus 148. In order to avoid conflict for a specific register, rename buffers 144 and 146 store instruction results until completion unit 150 commits those results to an architected register in general purpose register file 140 or floating point register file 142. When dispatch unit 138 dispatches an instruction to an execution unit, a register within rename buffers 144 or 146 is allocated for the result. An identifier of the location for the result is provided to any execution unit requiring that result for an instruction operand, so that execution of the instruction may begin once the result is available.

Completion unit 150 retires executed instructions from the reorder buffers 152 and updates register files and control registers. Completion unit 150 recognizes exception conditions and can quickly remove instructions from a mispredicted branch. Integer or fixed point units 154 and 156 execute all integer instructions and may be single-cycle or multiple cycle units. Floating point unit 158 is preferably capable of performing both single and double precision operations in a single pass. Load/store unit 160 transfers data between the data cache and the result buses. Load/store unit 160 supports the address generation and handles any alignment for transfers to and from system memory. Load store unit 160 includes an effective address calculator or adder 162 dedicated for effective address calculation.

Those skilled in the art will recognize that processor 100 may vary from the depicted example for the purposes of the present invention. Such variations in which the present invention may be implemented are considered to be within the spirit and scope of the present invention.

Figure 2:
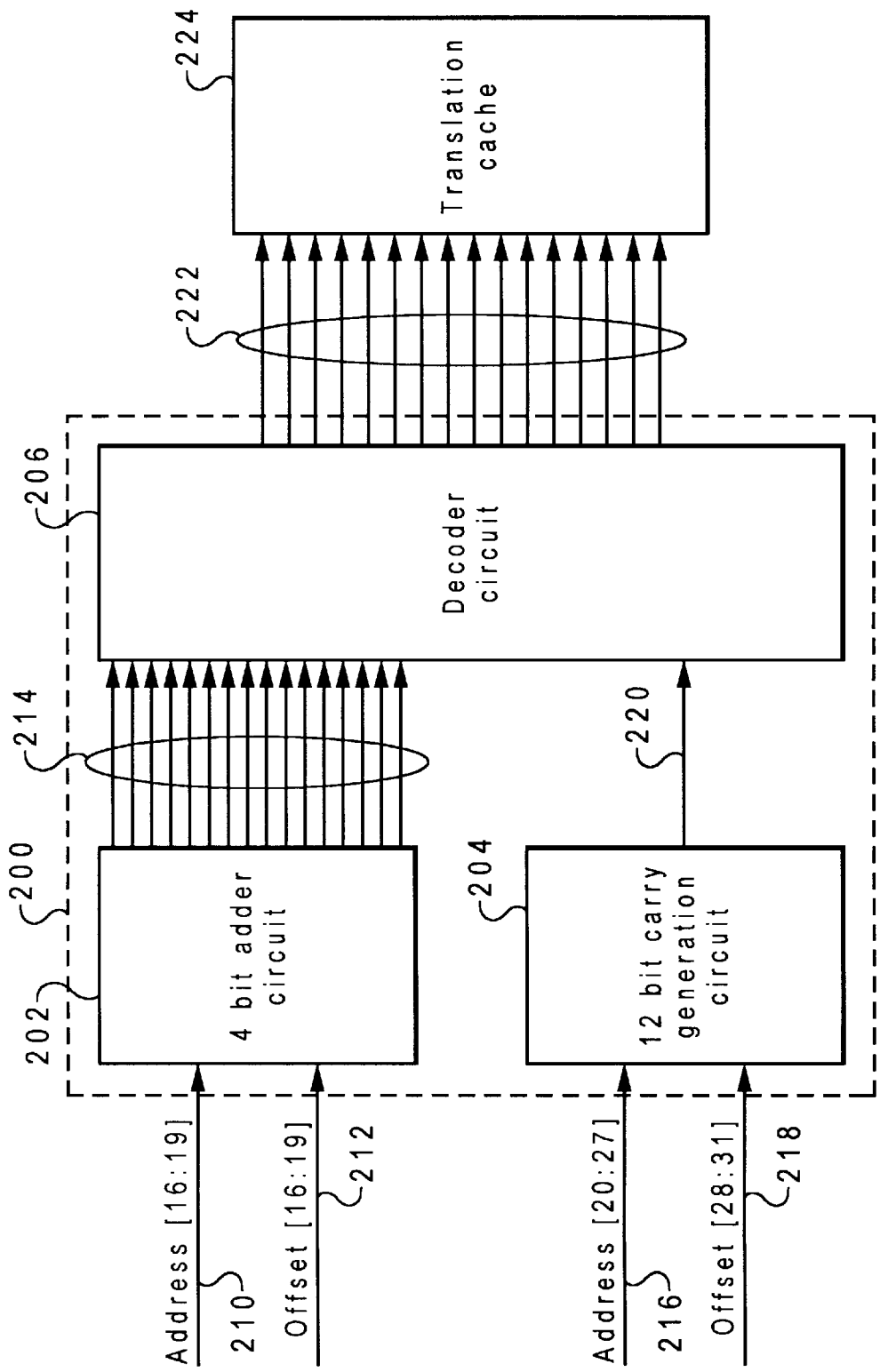
FIG. 2 is a block diagram of a logic circuit which may be implemented as part of an effective address calculator in a processor load/store unit in accordance with a preferred embodiment of the present invention.

Referring to FIG. 2, a block diagram of a logic circuit 200 which may be implemented as part of an effective address calculator in a processor load/store unit, such as effective address calculator 162 in FIG. 1, in accordance with a preferred embodiment of the present invention is portrayed. Logic circuit 200 combines the functions of adding numbers to generate an effective address and decoding the effective address to determine the translation array wordline which should be employed. Combined adder/decoder 200 contains three major components: an adder circuit 202, a carry generation circuit 204, and a decoder circuit 206. Adder 202 is a four bit adder with no carry input receiving bits [16:19] of the current fetch address at input 210 and bits [16:19] of the offset at input 212. Adder 202 generates a simple sum for bits [16:19] of the current address and offset. Adder 202 includes sixteen outputs 214 to decoder 206, only one of which is asserted once the sum result of the selected current address and offset fields is generated.

Carry generator 204 is a 12 bit carry calculator receiving bits [20:31] of the current fetch address at input 216 and bits [20:31] of the offset at input 218. Carry generator 204 includes a single output to decoder 206. Carry generator 204 calculates a value (a 0 or a 1) for the carry-in to bit [19] of the sum computed by adding bits [16:19] of the current address and offset.

Decoder 206 is a wordline decoder combining the results from adder 202 and carry generator 204. Decoder 206 includes sixteen possible wordline selects 222 to translation cache 224. The sixteen possible wordline selects 222 equals the number of wordlines in translation cache 224. Based on the output from adder 202, decoder 206 chooses two wordline selects from the sixteen possible selects 222: one corresponding to the result of the 4 bit addition in adder 202 and a second being the next higher wordline in the translation array than that which would be selected directly from the addition result. Depending on the value of the carry-in result from carry generator 204, decoder 206 asserts one of the two chosen wordlines. If the carry-in result is zero, decoder 206 asserts the wordline select corresponding to the result of the 4 bit addition; if the carry-in result is one, decoder 206 asserts the higher wordline of the pair. This action is comparable to adding one to the sum result of the four bit addition—the exact function of a carry-in. In adder/decoder 200, however, the carry-in is accounted for without integrating the carry into the actual addition circuit, which would be a less efficient implementation.

The output of adder/decoder 200, which combines the sum and carry computation functions of effective address generation with the decode function of effective address translation using a translation array, is sixteen wordline select outputs 222 from decoder 206. Only one of these sixteen wordline decoder outputs is active at any time. Because a full 32 bit addition is not required, a faster implementation may be realized. The concept of the 32 bit effective address generation is modified to require only generation of an address which is sixteen bits in length, corresponding to the 16 bit field within the 32 bit address employed to index the address translation cache. Furthermore, adder 202 may be optimized for the application, realizing a much faster circuit for implementation of the necessary addition function.

Figure 3:
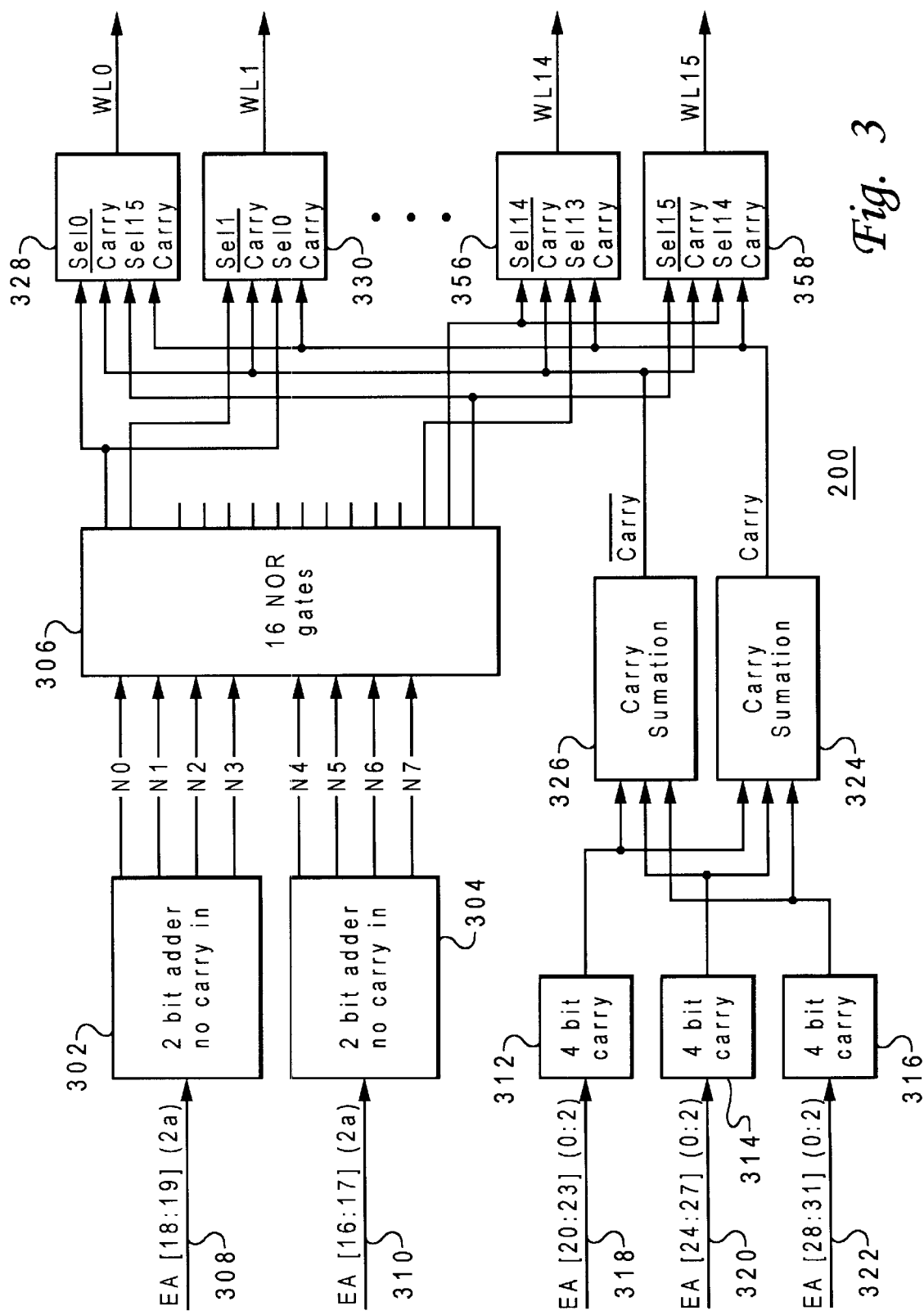
FIG. 3 depicts a specific implementation of a combined adder/decoder in accordance with a preferred embodiment of the present invention.

With reference now to FIG. 3, a specific implementation of a combined adder/decoder in accordance with a preferred embodiment of the present invention is depicted. The implementation depicted is a straightforward extension of the block diagram depicted in FIG. 2. The addition circuitry is implemented as two 2 bit adders 302 and 304 and sixteen 2 input NOR gates 306. Adders 302 and 304 are simple adders with no carry-in, the implementation of which is well known to those in the art. Each 2 bit adder includes inputs for the signals from which a sum result for two bits within the effective address index field may be calculated: adder 302 includes input 308 for receiving signals required to calculate a sum result for bits [18:19] of the effective address; similarly, adder 304 includes input 310 for receiving signals required to calculate a sum result for bits [16:17] of the effective address. The outputs of both adders 302 and 304 are combined through the use of 16 NOR gates 306 connected to the inverted output of each sum signal. Nor gates 306 provide sixteen outputs, each output corresponding to a different possible result for the addition of bits [16:19] of the effective address to be fetched. Only one of the sixteen outputs from NOR gates 306 is asserted at any time.

The carry generation circuitry is implemented as three 4 bit carry generators 312–316. Each carry generator 312–316 includes inputs for the signals from which a carry-in from four bits less significant than the effective address index field may be calculated: carry generator 312 includes input 318 for receiving signals required to calculate the carry-in from bits [20:23] of the effective address; carry generator 314 includes input 320 for receiving signals required to calculate a carry-in from bits [24:27] of the effective address; and carry generator 316 includes input 322 for receiving signals required to calculate a carry-in from bits [28:31] of the effective address. The outputs of carry generators 312–316 are provided to two carry summation units 324 and 326. Carry summation unit 324 calculates a carry-in signal for bit [19] of the effective address to be fetched. Carry summation unit 326 calculates the inverse of the carry-in signal for bit [19]. The outputs of carry summation units 324 and 326 are combined with the outputs of NOR gates 306 in the decoder circuitry to select the appropriate wordline.

The decoder circuitry is implemented as a series of sixteen complex gates 328–358, each for a different wordline in the translation array. (For clarity, twelve complex gates are not shown). Each complex gate 328–358 receives as an input two of the outputs from NOR gates 306: the output corresponding to the sum result of bits [16:19] of the effective address which indicates that the corresponding wordline should be selected, and the next lower output. For example, gate 330 receives as inputs both the output of NOR gates 306 indicating that wordline 1 (WL1) should be selected (Sel1) and the output of NOR gates 306 indicating that wordline 0 (WL0) should be selected (Sel0). Each of the sixteen outputs from NOR gates 306 is thus received as an input by two of the complex gates in the decoder circuitry. Each individual output from NOR gates 306 is received by both the complex gate for the wordline corresponding to that output (and therefore to that result of the index field addition) and the complex gate for the next higher wordline.

The carry-in and inverted carry-in signals from carry summation units 324 and 326 are also received as inputs by complex gates 328–358. The inverted carry-in signal is paired with the output from NOR gates 306 corresponding to the wordline for the complex gate, while the carry-in signal is paired with the output from NOR gates 306 corresponding to the next lower wordline. Again using complex 330 as an example, the inverted carry-in signal is paired with the output of NOR gates 306 indicating that wordline 1 (WL1) should be selected (Sel1) while the carry-in signal is paired with the output of NOR gates 306 indicating that wordline 0 (WL0) should be selected (Sel0). Thus the wordline determined by the adder circuitry is selected if the carry equals zero. Otherwise, the next wordline is selected.

Figure 4A:
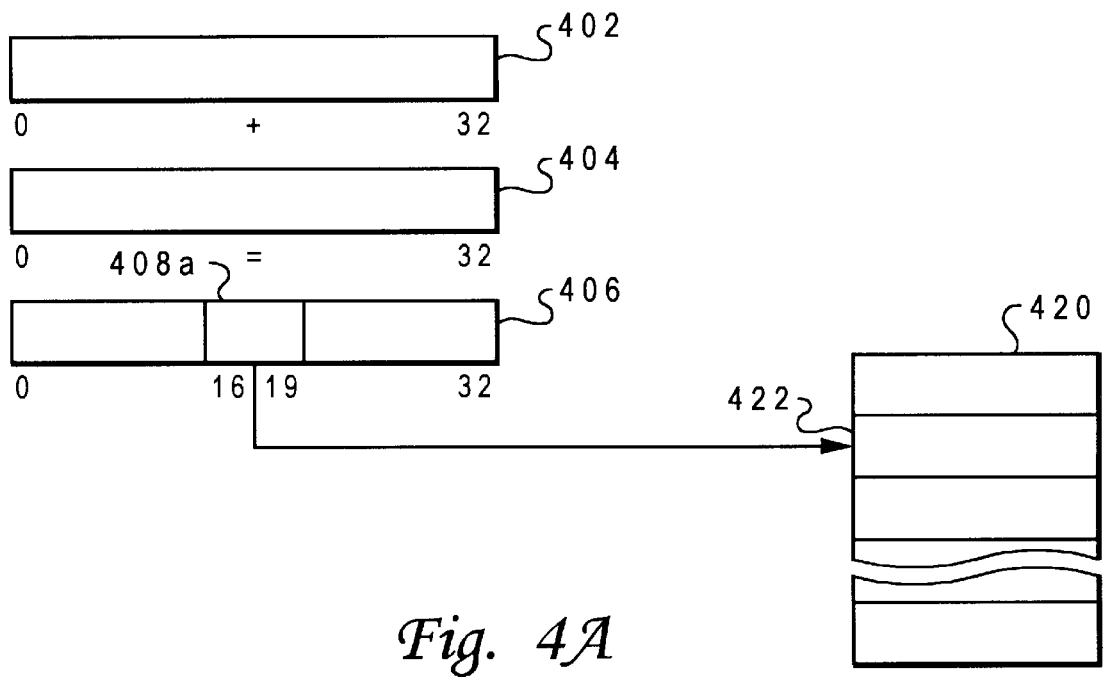
FIGS. 4A–4C are block diagrams for comparison of the effective address generation and decoding processes of the prior art and the present invention.
Figure 4B:
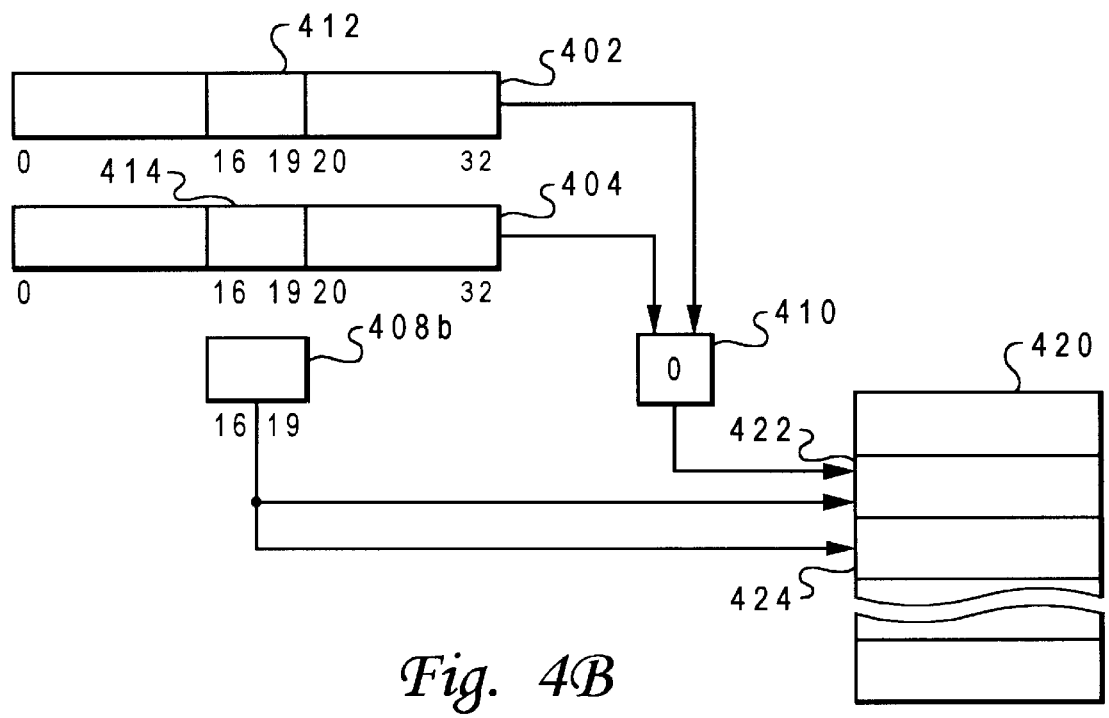
Figure 4C:
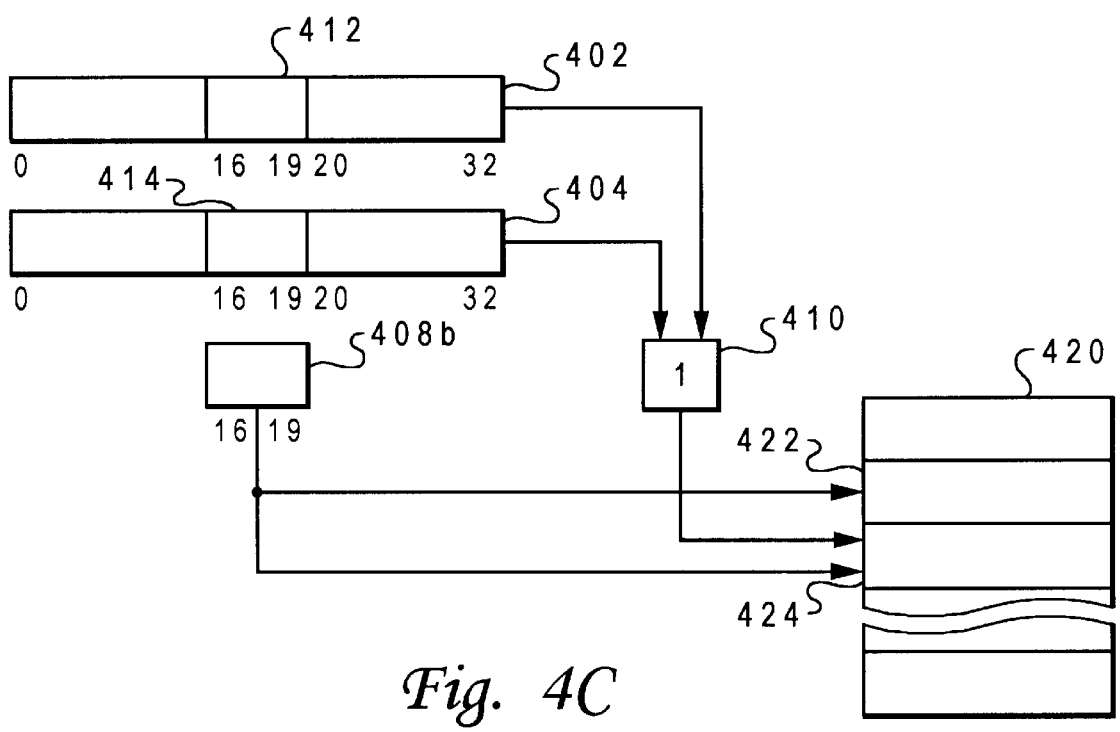

Referring to FIGS. 4A–4C, block diagrams are provided for comparison of the effective address generation and decoding processes of the prior art and the present invention. FIG. 4A depicts the effective address generation and decoding process of the prior art. The full 32 bits of a current fetch address 402 are added to the full 32 bits of an offset 404 to calculate a full 32 bit effective fetch address 406. An index field 408a within the full fetch address 406 is then employed to select an entry 422 within a translation array 420.

FIGS. 4B–4C depict the effective address generation and decoding process of the present invention. A field 412 within the full 32 bit current fetch address 402 is added to a corresponding field 414 within the full 32 bit offset 404. The resulting sum 408b is used to tentatively select two entries 422 and 424 within a translation array 420. The lower of the two entries selected, 422, is the array entry indexed by the sum of field 412 from the current address and field 414 from the offset. This is the correct entry within array 420 for address 402 and offset 404 if no carry-in is generated by lower order bits (bits less significant than fields 412 and 414). The next higher entry 424 in array 420, which is the correct entry if a carry-in is generated by the lower order bits, is also selected.

Concurrently with the addition of fields 412 and 414 from address 402 and offset 404, a carry-in value 410 is computed from the lower order bits in address 402 and offset 404. The carry-in value 410 is used to select one of the two entries 422 and 424 within array 420. If the carry-in value is zero, as depicted in FIG. 4B, the lower entry 422 is the correct entry decoded for the fetch address computed from address 402 and offset 404. On the other hand, if the carry-in value is one as depicted in FIG. 4C, the next higher array entry 424 corresponds to the entry for the fecth address computed and decoded from address 402 and offset 404. The correct translation array entry may then be utilized for effective-to-real address translation. Because the process depicted in FIGS. 4B and 4C may be completed faster than the process depicted in FIG. 4A, the effective-to-real address translation may begin earlier in the processor cycle and may be completed earlier.

Figure 5:
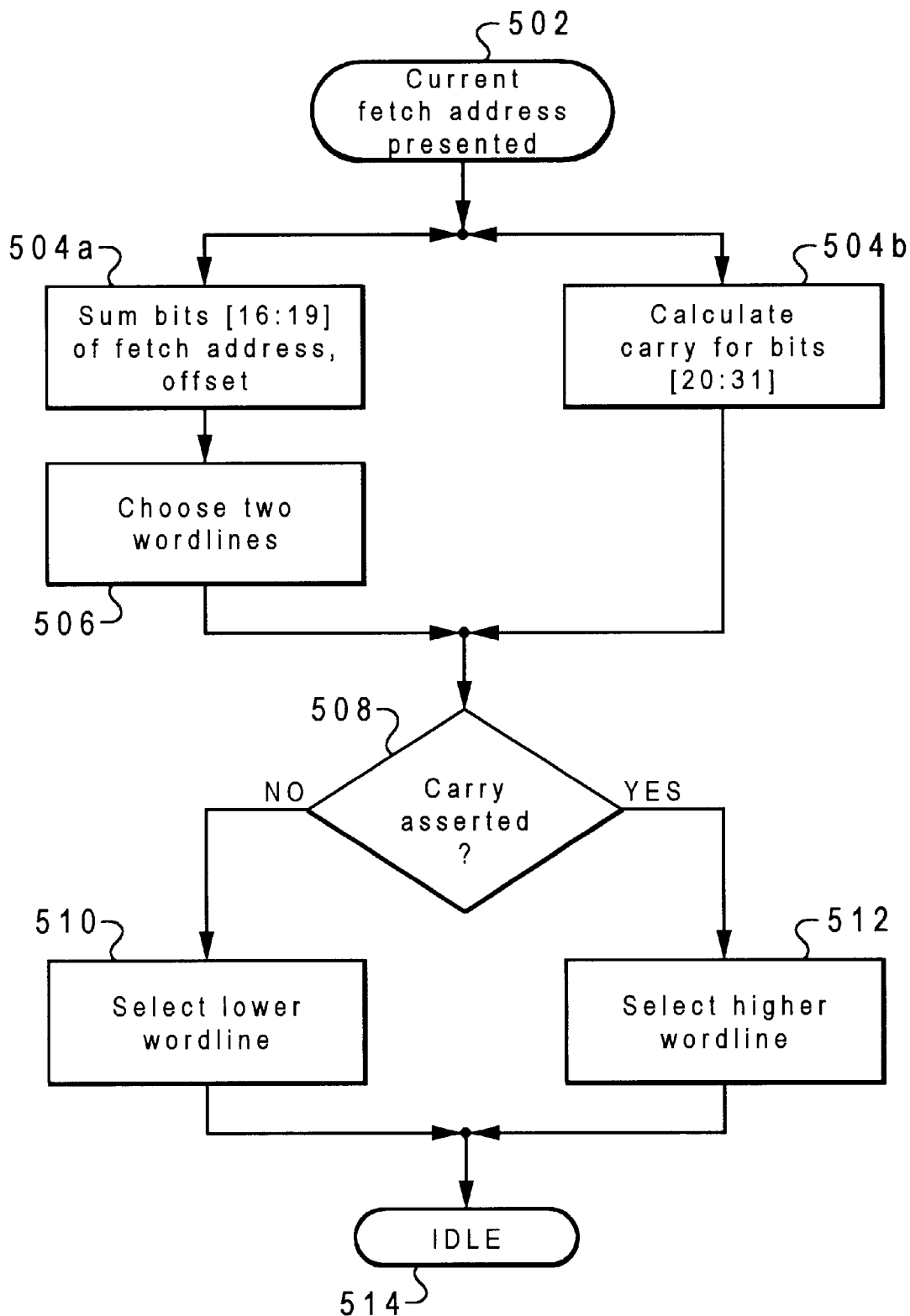
FIG. 5 depicts a high level flowchart for a process of concurrently generating and decoding an effective address in accordance with a preferred embodiment of the present invention.

With reference now to FIG. 5, a high level flowchart for a process of concurrently generating and decoding an effective address in accordance with a preferred embodiment of the present invention is disclosed. The process of generating an address translation begins at step 502, which depicts presentation of the current fetch address to the address translation circuits. The address translation circuits require that a field from the full 32-bit fetch address be utilized to index the lines of the translation cache. In the specific exemplary embodiment of FIGS. 2 and 3, bits [16:19] are used to decode sixteen wordlines in the translation cache.

Conceptually, the effective address is generated by taking the previous fetch address and adding a 32 bit offset to form a 32 bit result address. However, a 32 bit sum requires more time to generate than a 16 bit sum result. Therefore, assuming that both addition operations could be started at the same time, a 16 bit sum result may be generated for address translation purposes earlier than a 32 bit sum result. Additionally, the translation array only requires the result of a 16 bit addition to initiate access of the array. That is, the sum of bits [16:31] of the current fetch address and the offset is required to initiate access to the translation array. Therefore, a 16 bit addition may allow access of the translation cache to start substantially earlier than waiting for a full 32 bit sum to be generated.

Once the current fetch address is available, the process passes to step 504a, which illustrates addition of bits [16:19] of the current fetch address with bits [16:19] of the offset. As described earlier, the index to the translation array utilizes bits [16:19] of the fetch address to access the appropriate translation array entry. Therefore, only bits [16:19] of the computed effective address to be fetched are required to access the translation array. Bits [16:19] of the current address may be summed with bits [16:19] of the displacement value to form the portion of the new translation address used access the translation cache. As with any addition, however, less significant bits [20:31] may generate a carry-in to bit [19].

Therefore, once the current fetch address is available, the process passes not only to step 504a, but also concurrently to step 504b, which depicts calculating the carry-in from bits [20:31]. The process path through step 504a, once that step is complete, passes to step 506, which illustrates choosing two wordlines based on the sum result of bits [16:19], the lower wordline of the pair corresponding to the sum result and the higher wordline being the next higher wordline than that corresponding to the sum result.

The process then passes to step 508, which depicts a determination of whether the carry from bits [20:31] into bit [19] is asserted. If not, the process proceeds to step 510, which illustrates selection of the lower wordline from the wordline pair chosen in step 506. Otherwise, the process proceeds to step 512, which depicts selection of the higher wordline in the chosen wordline pair. In either event, the process next passes to step 514, which illustrates the process becoming idle until the next fetch address is presented.

The present invention allows the current fetch address to be computed and decoded faster. This lessens the overall time required for the complete effective-to-real address translation process. The present invention also allows the fetch address index field to be calculated and decoded for accessing the translation cache much earlier than otherwise possible. This allows the translation in the translation cache to start considerably earlier in the timing cycle than would be possible if the full 32 bit addition were first computed. Therefore, the present invention provides substantial benefits to processor performance both by increasing the speed of address translation and by permitting critical translation steps to be performed earlier in the timing cycle. Allowing the translation circuits to begin effective-to-real address translation earlier allows the total translation process to be completed at an earlier point in the processor cycle, improving internal timing.

The combined adder/decoder of the present invention provides a faster mechanism for calculating and decoding the required information for initiating an effective-to-real address translation by computing only the fetch address index field rather than the full fetch address. The carry-in from less significant bits is accounted for without incorporation into the adder, further increasing the speed of the decoding process.

While the invention has been particularly shown and described with reference to a preferred embodiment, it will be understood by those skilled in the art that various changes in form and detail may be made therein without departing from the spirit and scope of the invention.

What is claimed is:

1. A method of address translation in a processor, comprising:

computing an effective address field indexing entries in a translation array without including a carry-in from addition of a plurality of less significant bits in an address and an offset employed to compute said effective address;

selecting a plurality of entries within said translation array utilizing said effective address field;

calculating said carry-in from said plurality of less significant bits without adding said plurality of less significant bits in said address and said offset; and selecting an entry within said plurality of entries utilizing said carry-in.

2. The method of claim 1 wherein said step of computing an effective address field further comprises adding bits within an offset corresponding to said field to bits within a current address corresponding to said field to generate a sum.

3. The method of claim 2 wherein said step of selecting a plurality of entries within a translation array further comprises:

selecting a first entry within said translation array indexed by said sum; and selecting a second entry within said translation array immediately following said first entry within said translation array.

4. The method of claim 1 wherein said step of selecting an entry within said plurality of entries utilizing said carry-in further comprises:

responsive to determining that said less significant bits do not generate a carry-in, selecting said first entry; and responsive to determining that said less significant bits generate a carry-in, selecting said second entry.

5. An apparatus for address translation in a processor, comprising:

adder means for computing an effective address field indexing entries in a translation array without including a carry-in from addition of a plurality of less significant bits in an address and an offset employed to compute said effective address;

selection means for selecting a plurality of entries within said translation array utilizing said field;

carry generator means for calculating said carry-in from said plurality of less significant bits without adding said plurality of less significant bits in said address and said offset; and decoder means for selecting an entry within said plurality of entries utilizing said carry-in.

6. The apparatus of claim 5 wherein said adder means further comprises means for adding bits within an offset corresponding to said field to bits within a current address corresponding to said field to generate a sum.

7. The apparatus of claim 6 wherein said selection means further comprises:

means for selecting a first entry within said translation array indexed by said sum; and means for selecting a second entry within said translation array immediately following said first entry within said translation array.

8. The apparatus of claim 5 wherein said decoder means further comprises:

decoder means, responsive to determining that said less significant bits do not generate a carry-in, for selecting said first entry; and decoder means, responsive to determining that said less significant bits generate a carry-in, for selecting said second entry.

9. A combined adder/decoder in a processor including a translation array having entries indexed by an address field, comprising:

an adder computing an address field corresponding to an index for said translation array entries without including a carry-in from addition of a plurality of less significant bits in an address and an offset employed to compute said address field and generating a signal coinciding with a plurality of entries within said translation array;

a carry generator calculating a carry-in from said plurality of less significant bits without adding said plurality of less significant bits in said address and said offset; and a decoder receiving said signal from said adder and said carry-in from said carry generator, said decoder selecting an entry within said plurality of entries utilizing said carry-in.

10. The combined adder/decoder of claim 9, wherein said adder computes said field without including a carry-in from a plurality of less significant bits in an address containing said field.

11. The combined adder/decoder of claim 9, wherein said adder further comprises a 4 bit adder.

12. The combined adder/decoder of claim 9, wherein said adder further comprises:

two 2 bit adders; and a plurality of NOR gates combining the outputs of said two 2 bit adders to generate said signal.

13. The combined adder/decoder of claim 9, wherein said plurality of entries further comprise:

a first entry indexed by a first value for said field, said first value corresponding to a current value computed by said adder; and a second entry indexed by a second value for said field, said second value higher than said first value.

14. The combined adder/decoder of claim 13, wherein said decoder selects said first entry if said carry-in is not asserted and selects said second entry if said carry-in is asserted.

15. The combined adder/decoder of claim 9, wherein said decoder further comprises:

a plurality of complex gates, each complex gate within said plurality of complex gates corresponding to an entry in said translation array.

16. The combined adder/decoder of claim 9, wherein said carry generator further comprises:

a twelve bit carry generator asserting a first signal if a carry-in is not generated by said plurality of less significant bits and asserting a second signal if a carry-in is generated by said plurality of less significant bits.

17. The combined adder/decoder of claim 16, wherein said decoder selects said first entry if said first signal is asserted by said carry generator and selects said second entry if said second signal is asserted by said carry generator.

18. The combined adder/decoder of claim 16, wherein said decoder further comprises a plurality of complex gates, each complex gate within said plurality of complex gates corresponding to a coinciding entry in said translation array, each complex gate receiving at a first input a signal asserted by said adder if said address field computed by said adder indexes said coinciding entry and at a second input a signal asserted by said adder if said address field computed by said adder indexes a preceding entry in said translation array, each complex gate receiving said first and second signals from said decoder, and each complex gate selecting said coinciding entry if either signal received from said adder at said first and second inputs is asserted.

\* \* \* \* \*

UNITED STATES PATENT AND TRADEMARK OFFICE
CERTIFICATE OF CORRECTION

PATENT NO. : 5,970,512
DATED : October 19, 1999
INVENTOR(S) : Martens et al.

It is certified that error appears in the above-indentified patent and that said Letters Patent is hereby corrected as shown below:

Col. 4, Line 26 please delete "130" and insert --114--.

Signed and Sealed this

First Day of May, 2001

Attest:

NICHOLAS P. GODICI

Attesting Officer     Acting Director of the United States Patent and Trademark Office